United States Patent
Markoff et al.

(10) Patent No.: US 7,448,422 B2
(45) Date of Patent: Nov. 11, 2008

(54) PNEUMATIC RUN-FLAT TIRE

(75) Inventors: Michael Spiro Markoff, Uniontown, OH (US); David Charles Poling, Uniontown, OH (US); Samuel Patrick Landers, North Canton, OH (US)

(73) Assignees: The Goodyear Tire & Rubber Company, Akron, OH (US); Societe de Technologie Michelin, Clemont-Ferrand (FR)

( * ) Notice: Subject to any disclaimer, the term of this patent is extended or adjusted under 35 U.S.C. 154(b) by 441 days.

(21) Appl. No.: 11/109,361

(22) Filed: Apr. 19, 2005

(65) Prior Publication Data

US 2005/0236085 A1    Oct. 27, 2005

Related U.S. Application Data

(63) Continuation of application No. PCT/US2004/012255, filed on Apr. 22, 2004.

(51) Int. Cl.
 B60C 17/00 (2006.01)
 B60C 3/00 (2006.01)
 B60C 3/06 (2006.01)
 B60C 13/00 (2006.01)
 B60C 15/00 (2006.01)
 B60C 15/02 (2006.01)
 B60C 15/06 (2006.01)

(52) U.S. Cl. ............... 152/456; 152/454; 152/455; 152/517; 152/541; 152/544; 152/552; 152/555

(58) Field of Classification Search ........... 152/517, 152/454–456, 541, 544, 552, 555
See application file for complete search history.

(56) References Cited

U.S. PATENT DOCUMENTS

| | | | | |
|---|---|---|---|---|
| 5,058,646 A | * | 10/1991 | Kajikawa et al. | 152/517 X |
| 5,427,166 A | * | 6/1995 | Willard, Jr. | 152/517 X |
| 5,511,599 A | * | 4/1996 | Willard, Jr. | 152/517 X |
| 5,685,927 A | * | 11/1997 | Hammond et al. | 152/517 X |
| 5,971,047 A | | 10/1999 | Drieux et al. | |
| 6,142,205 A | | 11/2000 | Beck, Jr. et al. | |
| 6,401,777 B1 | | 6/2002 | Verbeke-Ensch et al. | |
| 6,453,961 B1 | | 9/2002 | Colantonio et al. | |
| 6,688,354 B2 | * | 2/2004 | Drieux et al. | 152/517 X |
| 2002/0020480 A1 | | 2/2002 | Chandezon et al. | |
| 2003/0106625 A1 | | 6/2003 | Drieux et al. | |

FOREIGN PATENT DOCUMENTS

| | | |
|---|---|---|
| CN | 1333721 | 1/2002 |
| FR | 2809054 | 11/2001 |
| FR | 2809348 | 11/2001 |
| JP | 05229316 A * | 9/1993 |
| WO | WO-200189861 A1 * | 11/2001 |

OTHER PUBLICATIONS

Chinese Office Action, completed Aug. 1, 2008.

* cited by examiner

*Primary Examiner*—Adrienne C Johnstone
(74) *Attorney, Agent, or Firm*—June E. Rickey

(57) ABSTRACT

A pneumatic run-flat tire has a bead configuration wherein the axially inner end is radially inward of the axially outer end of the bead. The sidewall of the tire, from the bead region to the upper sidewall is reinforced to form a pillar support in the sidewall. The bead configuration and the pillar reinforcement enable the tire to lock itself onto a tire rim during low pressure operation and be self-supporting.

17 Claims, 10 Drawing Sheets

PNEUMATIC RUN-FLAT TIRE

This is a Continuation of International Application Ser. No. PCT/US04/12255, filed on Apr. 22, 2004, presently pending.

FIELD OF THE INVENTION

The present invention relates to a tire with a radial carcass reinforcement, and more particularly, to the sidewall structure of the tire. It also relates to an assembly, formed by a tire and a rim.

BACKGROUND OF THE INVENTION

In the tire industry there are two basic systems that provide for under-inflated operation of a tire. The first system employs an insert set in the wheel rim that supports the underside of the tire tread when the tire is operated in an underinflated state; U.S. Pat. No. 5,785,781 discloses one such system. The second system employs a self-supporting tire wherein the tire sidewalls are reinforced such that during underinflated operating conditions, the tire is capable of supporting itself to permit operation; U.S. Pat. Nos. 4,365,659, 5,158,627, 5,368,082 and 6,453,961 disclose such self-supporting tires.

Each system has its limitations, making each system more suitable than the other system for particular applications. Systems using the wheel inserts can result in strike-through for low sidewall tires and smaller tires, as well as being more complex to assemble due to the wheel mounted support; while self-supporting tires for large sidewall tires and larger tires have a larger mass, leading to a decrease in rolling resistance and comfort.

The previous invention enables the two different solutions to cooperate to result in a simpler run-flat solution. The present invention is suitable for mid-size applications and combines the best features of both types of systems.

SUMMARY OF THE INVENTION

The present invention is directed to a run-flat tire system and a run-flat tire. The tire has a radial carcass reinforcement ply, a belt structure, and a pair of opposing bead regions. Each bead region has bead wire, a bead toe and a bead heel wherein the bead toe is axially outward and radially inward of the bead heel. Radially outward of each bead region is a tire sidewall. The cross-sectional width of each sidewall from radially outward of the bead region to the ends of the belt structure is substantially constant. To create the substantially constant width, a first rubber insert is located axially inward of the carcass reinforcement ply while a second rubber insert is located radially outward of the bead wire and axially outward of the carcass reinforcement ply.

In one aspect of the invention, the cross-sectional width of the sidewall varies by no more than 30% of the smallest cross-sectional width. In another aspect, the tire sidewall in the lower 50% of the tire height has a cross-sectional width that varies by no more than 20% of the smallest width of the sidewall cross-sectional width. Preferably, any variation in the cross-sectional width of the tire sidewalls occurs in the radially outer portion of the sidewalls so that the radially inner portion of the sidewalls retains a substantially constant width.

In another aspect of the tire, the first rubber and the second rubber inserts may or may not be formed from the same material. The rubber for at least the first rubber insert has a Shore A hardness at 100° C. in the range of 575 to about 90.

In another aspect of the tire, the first rubber insert has a radially innermost end that radially overlaps the second rubber insert, the overlap distance being in the range of 90 to 65% of the radial length of the second rubber insert. The radially outer end of the second rubber insert in each sidewall is preferably located at a radial height of 25% to 80% of the tire height.

In another aspect of the tire, the first rubber insert may be formed from multiple different rubber elements. When so formed of two rubber elements, one of the rubber elements may have a Shore A hardness greater than the other element. The rubber elements may be located radially adjacent to one another or axially adjacent to one another. When the elements are located radially adjacent to one another, the radially outer of the two rubber elements preferably has a Shore A hardness less than the radially inward rubber element.

In another aspect of the tire, the bead region has a rubber wedge located axially outward of the bead wire. The rubber wedge has a Shore A hardness greater than the Shore A hardness of either the first rubber insert or the second rubber insert.

In another aspect of the invention, the tire may be provided with additional sidewall reinforcing plies. In one embodiment, at least one short length reinforcing ply of parallel cords extends from the bead portion to the upper sidewall of the tire. The short length reinforcing plies may or may not be directly adjacent to the carcass reinforcing ply.

In another aspect of the invention, the carcass reinforcement ply is comprised of a pair of reinforcing cord plies. The tire may also have a further third insert located in the tire sidewall. Such a third insert is preferably sandwiched between the two carcass reinforcing cord plies.

In another aspect of the invention, the bead rings in each bead region have different bead diameters. The bead diameter is measured as the internal diameter of the bead wire ring. This results in an asymmetrical tire. The asymmetric tire may have differing sidewall constructions. In one such construction, the cross sectional width of the sidewall radially outward of the larger diameter bead ring is greater than the cross sectional width of the sidewall radially outward of the smaller diameter bead ring. In another construction, the first rubber insert in the sidewall radially outward of the larger diameter bead ring has a Shore A hardness less than the first rubber insert in the sidewall radially outward of the smaller diameter bead ring.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. Identical features in the various embodiments are referenced with common reference identifiers. The following description is made for the purpose of illustrating the general principles of the invention and should not be taken in a limiting sense. The scope of the invention is best determined by reference to the appended claims.

Figure 1:
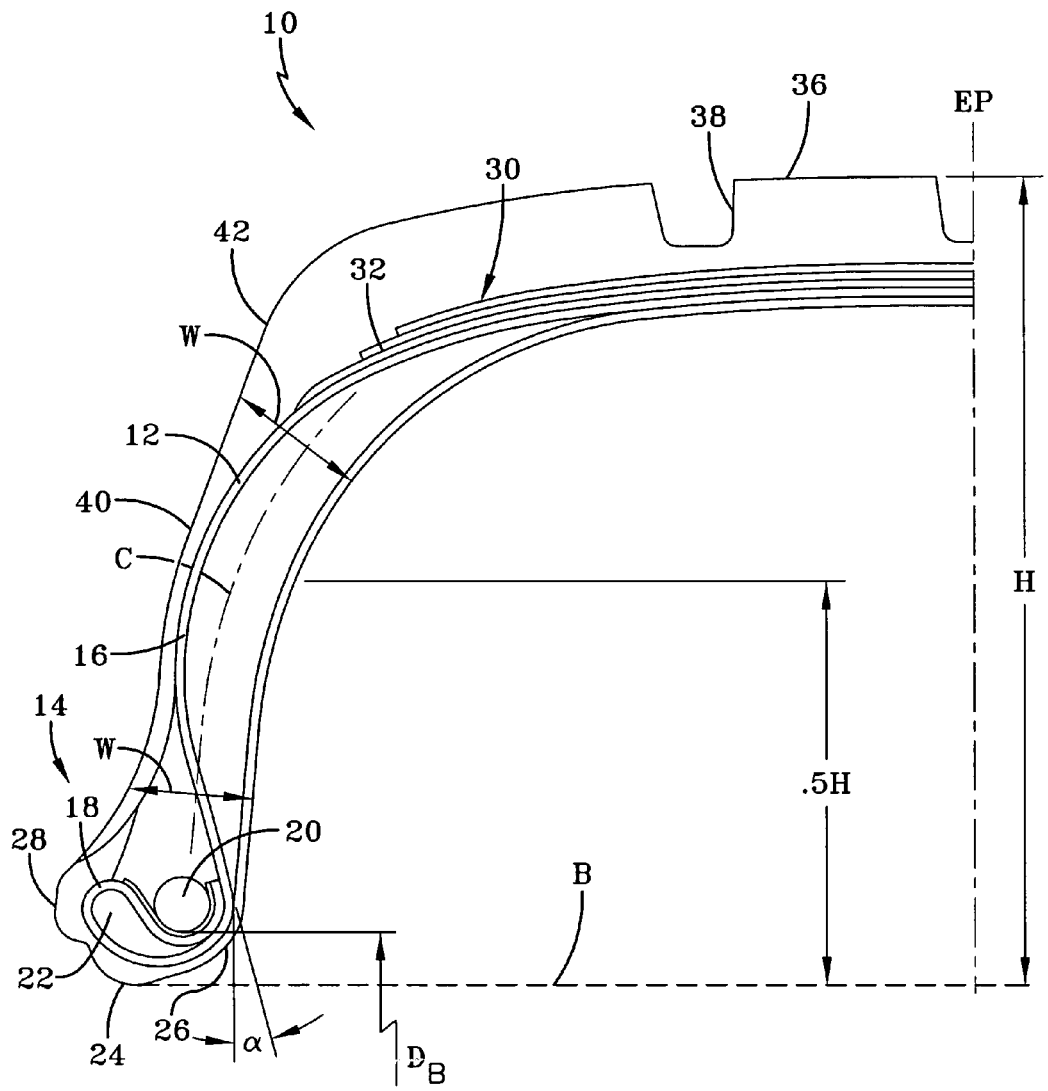
FIG. 1 is a cross sectional view of a tire in accordance with the invention.

FIG. 1 illustrates a self-supporting tire in accordance with the present invention; only half of the cross-sectional view of the tire is shown, it will be understood by those skilled in the art that the opposing, non-illustrated tire half may be identical to that illustrated and possible variations from that illustrated may be disclosed herein. The pneumatic tire 10 has a carcass comprising a carcass reinforcement ply 12 that extends from one bead portion 14 to an opposing bead portion 14. The carcass reinforcement ply 12 is formed of parallel reinforcing cords; the cords are inclined at angles of between 65° to 90° with respect to the equatorial plane of the tire 10. The cords are formed of any conventional carcass cord materials, including, but not limited to nylon, rayon, polyester, aramid, pen, fiberglass, steel, or any combination thereof.

The carcass reinforcement ply 12 has a main portion 16 extending about the main toroidal portion of the tire 10. The turn-up portions 18 of the carcass reinforcement ply 12 are the outer ends of the reinforcement ply 12 and extend radially under a bead ring 20 and then folds back under the bead ring 20. The bead ring 20 has a diameter $D_B$ as measured from the radially inner point of the bead ring. Each end of the carcass reinforcement ply 12 is sandwiched between the bead ring 20 and the main portion 16 of the carcass reinforcement ply 12. To maintain the profile of the turn-up portion 18 as the ply 12 folds back under the bead ring 20, the turn-up portion 18 folds about a rubber wedge 22 located axially outward of the bead ring 20.

The bead portion has an outer cross-sectional profile wherein as the profile moves from the axially outer side of the bead portion to the axially inner side, the bead profile slopes radially upward. In this tire, the bead toe 24 is both axially outward and radially inward of the bead heel 26. Above the bead toe 24 is a rib 28 that assists in locking the tire onto a wheel rim, as discussed below. This bead profile is contrary to a conventional tire wherein the bead toe is radially and axially inward of the bead heel and it is the bead heel that fits into the curved portion of the wheel rim where the rim seat and the wheel flange meet.

The carcass reinforcement ply configuration in the bead portion 14 of the tire 10, when the tire 10 is mounted on a wheel (not illustrated), the rim of which corresponding to the outer configuration of the bead portion 14, operates in the following manner. As the carcass reinforcement ply 12 is placed in tension by the air pressure inside the tire 10, the reinforcement ply main portion 16 is expanded radially outward. As the main portion 16 expands, it pulls on the turnup portion 18, pulling the bead toe 24 radially inward into the wheel rim and flange, effectively acting to lock the bead portion 14 of the tire 10 onto the wheel.

The bead ring 20 is illustrated with an overall circular configuration. The bead ring 20 is an inextensible hoop of steel formed from multiple windings of steel. The bead ring 20 may also have other overall configurations such as hexagonal or square, or any combination of circular, hexagonal and square.

Radially outward of the carcass reinforcement ply main portion 16 is the belt structure 30. The belt structure 30 includes one to four reinforcing plies 32 of parallel cords. The cords of the reinforcing ply 32 may be woven or unwoven and are inclined at angles of 17° to 35° with respect to the equatorial plane EP of the tire 10. The cords of any adjacent belt plies 32 are preferably inclined in opposing directions with respect to the equatorial plane EP of the tire 10. The cords of the belt plies 32 are formed of any conventional belt cord materials, including but not limited to steel, aramid, nylon, rayon, fiberglass, polyester, pen, or any combination thereof. Depending on the final tire characteristics desired by the tire engineer, a conventional zero degree ply (not illustrated) may be located within the belt structure 30.

Radially outward of the belt structure 30 is the tire tread 36. The tread 36 is illustrated as having multiple circumferential grooves 38. The tread 36 may have any number or pattern of circumferential and/or lateral grooves or combination of grooves. The tread pattern selected by the tire engineer is dependent upon the intended application of the tire; i.e. a small passenger vehicle, mid-size passenger vehicle, small to mid-size passenger truck, etc.

At the axially outer edges of the tread 36 and the belt structure 30 and radially outward of the bead portions 14 are the tire sidewalls 40. In accordance with the present invention, radially outward of the bead portion 14, the cross-section width W of the tire sidewall 40 is substantially constant. The initial point of the substantially constant width W is at a radial height of 15 to 25% of the radial height H of the tire 10, as measured from the bead base line B, the bead base line B being drawn at the radially innermost point of the bead toe 24, and no more than 5% of the radial height H of the tire 10 from the radially outer surface of the bead ring 20. The width W is measured as the maximum distance between the outer surface of the tire and the innermost surface of the tire 10 and measured perpendicular to points along the curvature C of the tire sidewall 40.

The variation in the width W of the tire sidewall 40 in the lower 50% of the tire height H is no more than 20% of the smallest width. The tire sidewall 40 in the radially outer 50% of the tire height H can have a greater variation in the width due to the increased thickness at the tire shoulder 42. The radially outermost point of the substantially constant width of the tire 10 is at the axially outermost edge of the belt structure 30. The variation in the width W in the radially outer 50% of the tire height H is no more than 30% of the smallest width in the radially outer 50% of the tire height H.

By forming the tire 10 with a substantially constant width initiating in the bead region 14, a pillar effect is created in the tire 10. That pillar provides the tire 10 with the support necessary for continued operation when the tire 10 is at a reduced internal pressure. By forming the lower sidewall region with a constant thickness, the bead region 14 provides a fixture, or non-moving base, to the pillar. During reduced pressure operation, the pillar effect also assures that the carcass reinforcement ply 12 remains in tension at all times and does not separate the locking bead effect of the carcass from the self-supporting nature of the sidewall pillar.

Figure 2:
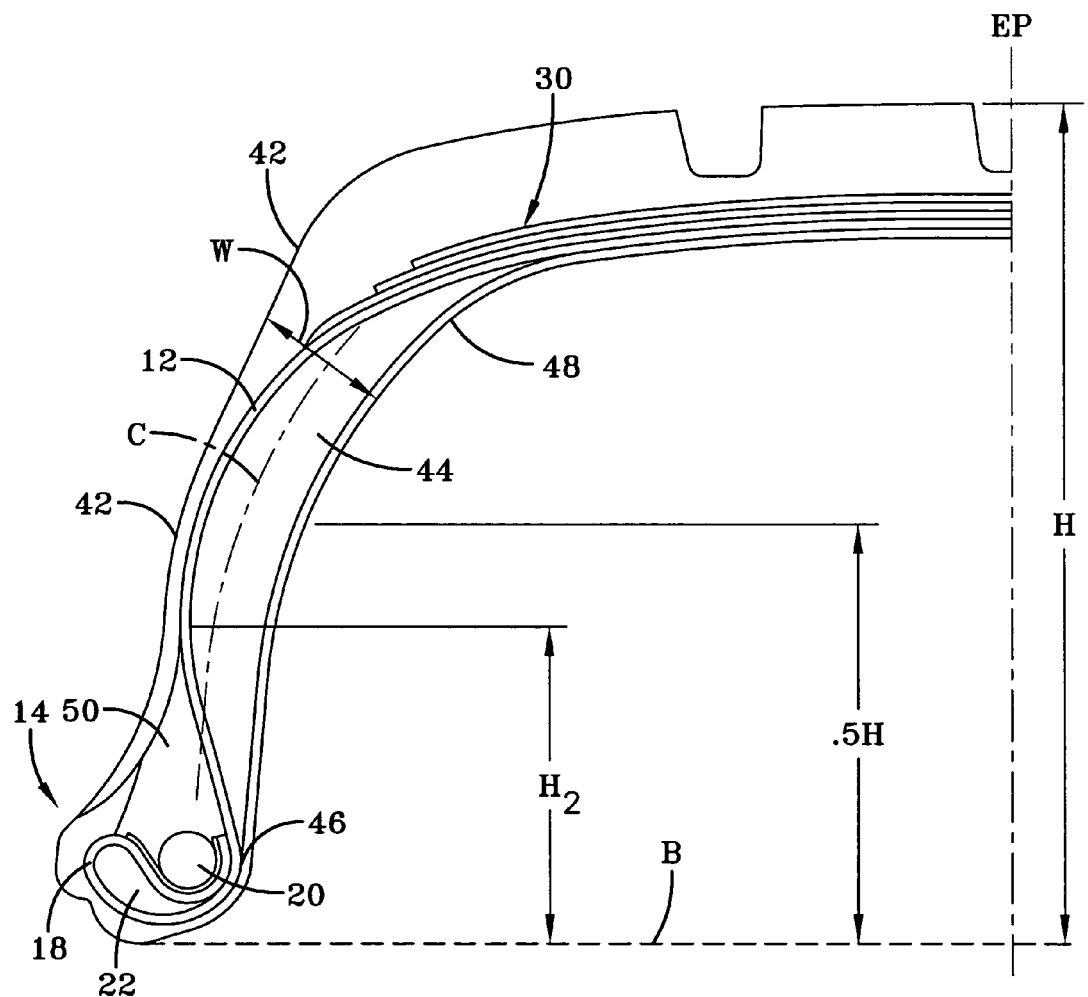
FIG. 2 is another cross sectional view of a tire.

In the tire of FIG. 2, the thickness of the tire in the shoulder 42, or upper sidewall region, has been reduced, in comparison to the tire of FIG. 1. The reduction in the tire thickness in the shoulder 42 renders the upper sidewall more flexible and improves the overall tire ride comfort. Thus for the tire of FIG. 2, the variation in the width W, as measured perpendicular to points along the curvature C of the tire sidewall 40, is no greater than 15%. This reduction in the upper sidewall thickness may be achieved by reducing the shoulder rubber gauge axially outward of the carcass reinforcement ply 12 or the gauge of any rubber located axially inward of the carcass reinforcement ply 12.

The substantially constant sidewall thickness is created by at least one insert 44. The insert 44 is lenticular in configuration with the middle third of the insert 44 having a substantially constant thickness and the ends of the insert 44 being tapered. The insert 44 extends from the bead portion 14 to radially inward of the belt structure 30. When the insert 44 extends through the entire sidewall 40, it has an initiation point 46 axially inward of the bead ring 20 and radially inward of the radially outmost surface of the bead ring 20, creating a radial overlap between the inner end of the insert 44 and the bead ring 20. The illustrated insert 44 is sandwiched between the carcass reinforcement ply 12 and the tire inner liner 48.

The insert 44 is formed from a hard rubber, with a Shore A hardness at 100° C. in a range of about 55 to about 90, with a preferred range of 60 to 70. Regarding additional properties of the insert, the properties disclosed in U.S. Pat. No. 6,230,773 are suitable for the insert 44 of the present invention. The properties may be achieved by the compound disclosed in the referenced US patent, or other compounds may be selected which yield the disclosed properties. The rubber forming the insert 44 may also be flock loaded or blended with reinforcing fibers. Fibers useful may be either natural or man-made, and are characterized by having a length at least 100 times its diameter or width. Flock are particles smaller than fibers. And either may be formed from cotton, aramid, nylon, polyester, PET, PEN, carbon fiber, steel, fiberglass, or any combination thereof. The fiber or flock loading of the rubber is in the range of 5 to 35 parts per hundred parts rubber.

The insert's lenticular configuration maintains the carcass main portion in a desired configuration. A majority of the portion of the carcass reinforcement ply main portion 16 located in the lower 50% of the tire height is maintained an angle $\alpha$ of 15° to a maximum 30° relative to the equatorial plane of the tire (see FIG. 1). Maintaining the carcass ply in this configuration facilitates a concave ply path, as viewed from the inside of the tire, thus enabling the ply to be in a better state of tension under loading.

A second insert 50 is located radially outward of the bead ring 20 and axially outward of the main carcass portion 16. The insert 50 generally has a triangular shape, similar to a conventional apex. The second insert 50 decreases in width as the first insert 44 increases in width; maintaining a substantially constant thickness of a formed pillar configuration in the lower sidewall region of the tire 10. The radial overlap of the first insert 44 and second insert 50 is in the range of 90% to 65% of the radial length of the second insert 50.

Figure 3A:
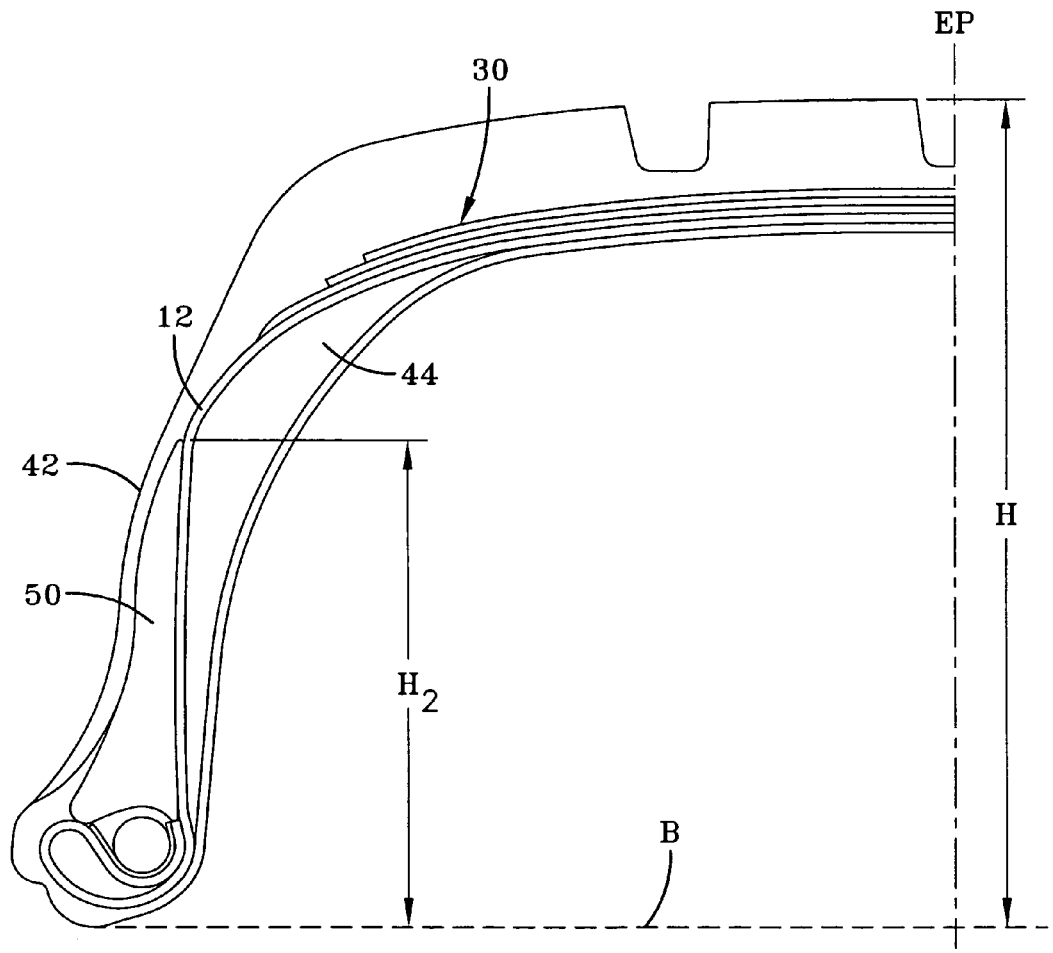
FIGS. 3a and 3b are cross sectional views of a tire with varying height axially outer inserts.
Figure 3B:
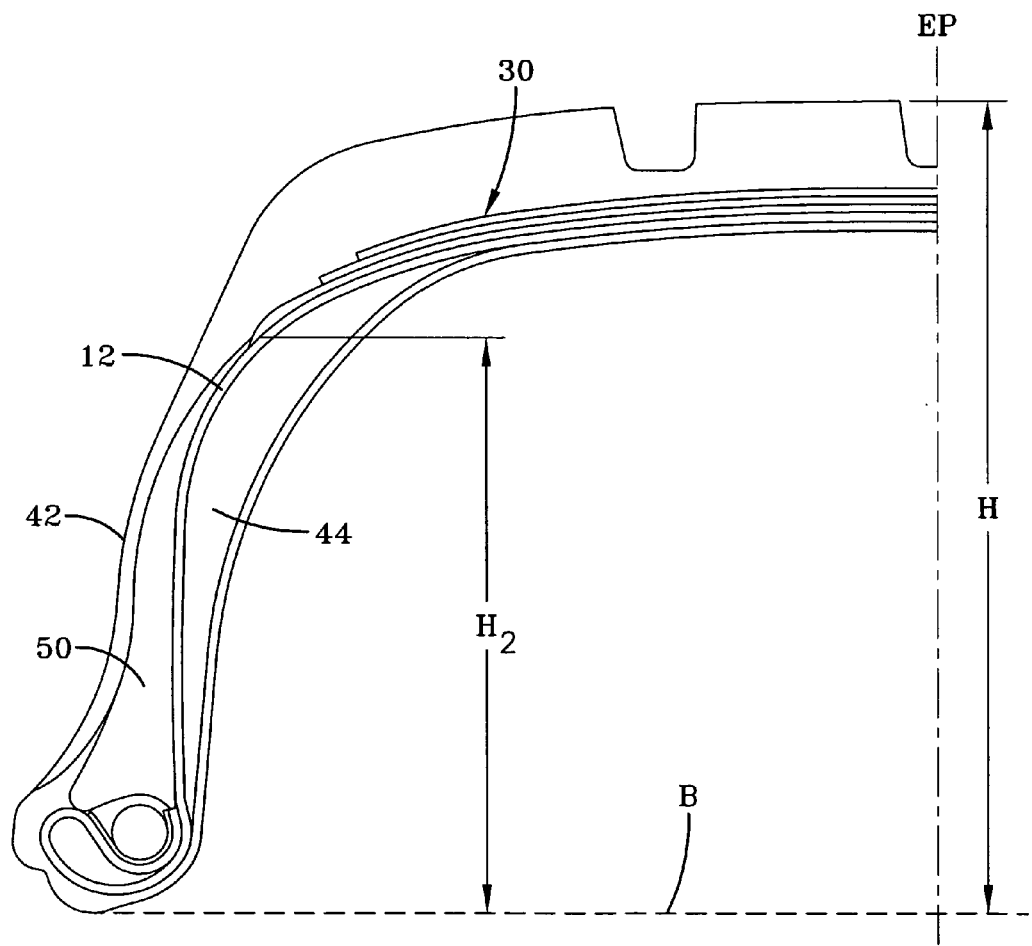

The second insert 50 has a radially outer termination point at a height $H_2$ that can vary from 25% to 80% of the tire height H, see also FIGS. 3a and 3b. In FIG. 2, the second insert 50 has a termination height H2 of about 40%, while the termination height H2 for FIGS. 3a and 3b is about 59% and 70% respectively. As the height H2 of the second, or axially outer, insert 50 increases, the gauge of the axially inner first insert 44 is decreased. Preferably, due to the corresponding increase/decrease in gauge of the two inserts 44, 50, the total cross-sectional gauge of the inserts 44, 50 is substantially constant from the radially outer surface of the bead wire 20 to an axially outer end of the belt structure 30.

The second insert 50 preferably has a Shore A hardness equivalent to the Shore A hardness of the first insert 44. However, to vary the performance characteristics of the tire, the Shore A hardness of the second insert 50 may be greater or less than that of the first insert 44.

Figure 4A:
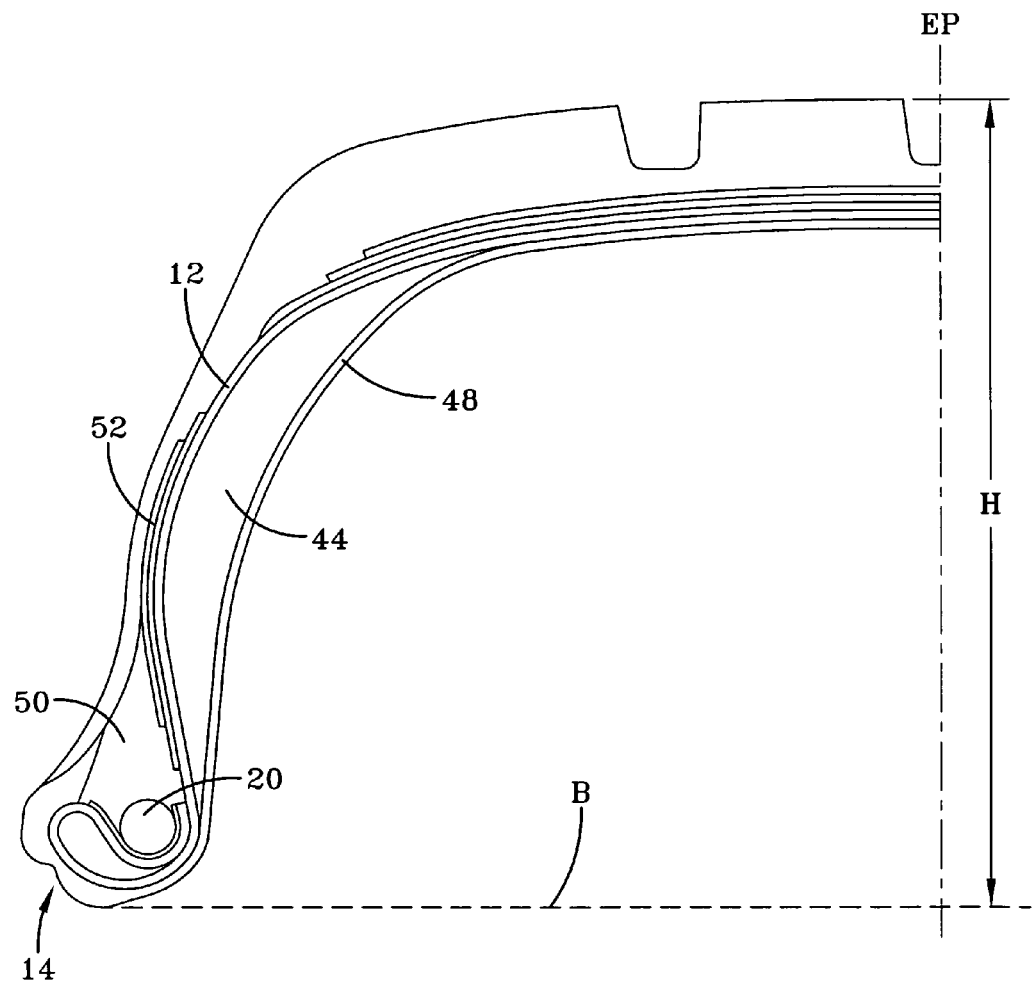
FIGS. 4a and 4b are alternative views of a tire incorporating sidewall plies

FIG. 4a illustrates another variation in the tire. During building of the tire, after the sidewall inserts 44 are laid on the building drum, and the carcass reinforcement ply 12 is prepared, at least one ply 52 of fabric or steel is laid adjacent to the carcass reinforcement ply main portion 16. The fabric or steel ply 52 is comprised of rubber coated parallel cords. The ply 52 is cut and laid so that the parallel cords are inclined at a degree of 30° to 50° relative to the circumferential direction of the tire. If two or more such fabric or steel plies 52 are used, the cords in the adjacent plies 52 are laid so as to be inclined in opposing directions. The cords may be formed from steel, aramid, polyester, nylon, or rayon. The presence of the ply 52 reinforces the sidewalls 40 and reduces the cross sectional area of the sidewall 40 as a portion of the tire load is carried by the plies 52.

Figure 4B:
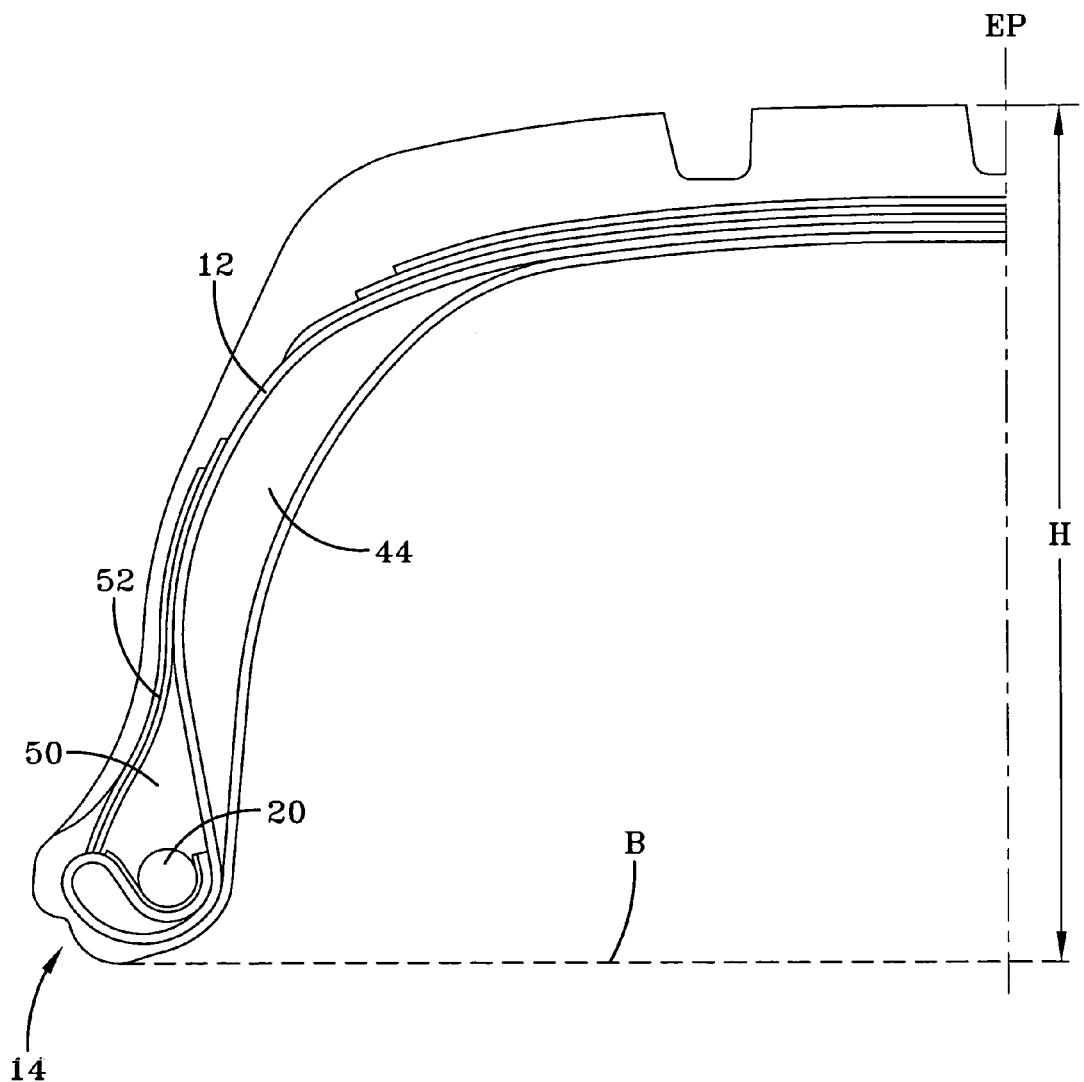

FIG. 4b is a tire similar to that of FIG. 4a; however, the additional plies 52 are placed axially outward of the triangular inserts 50 to reinforce the sidewalls 40 of the tire. When placed in this position, the plies 52 are placed in compression, instead of in tension as in the tire of FIG. 4a.

Figure 5:
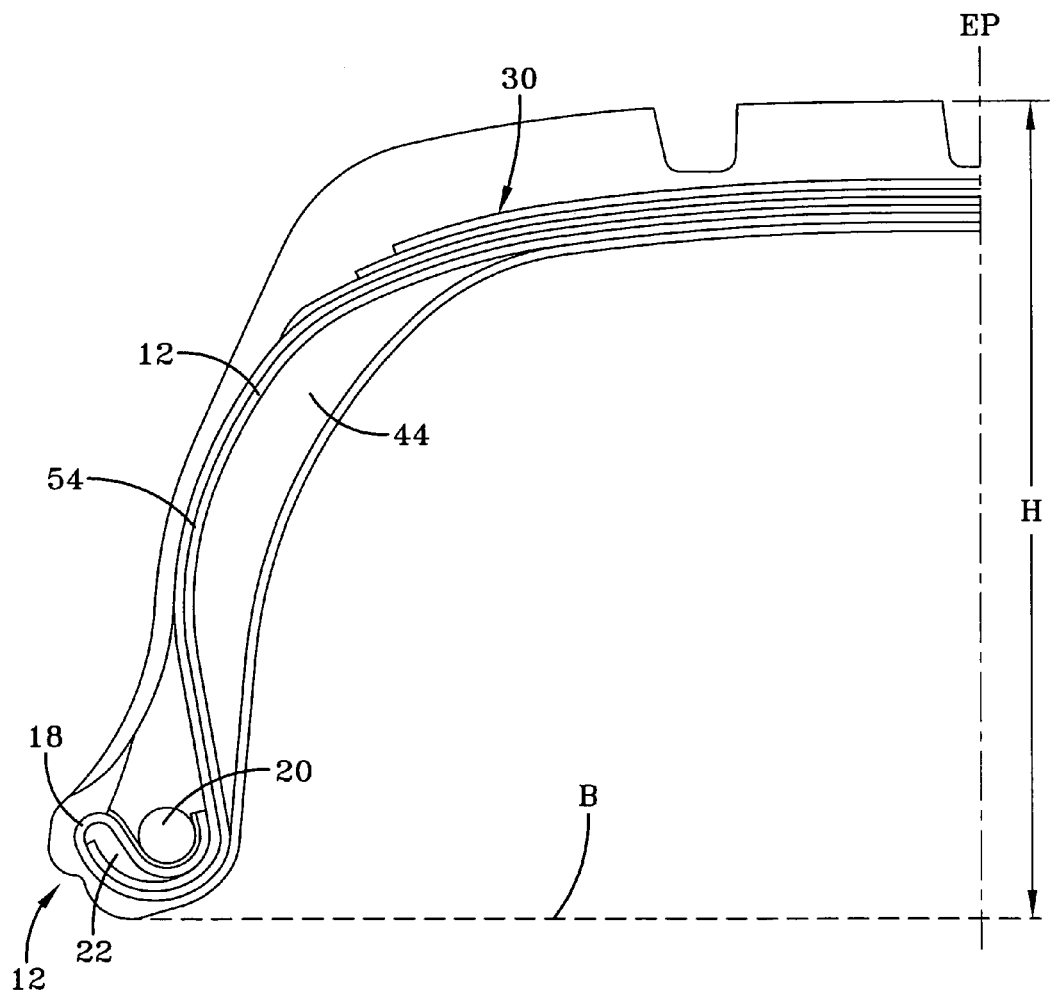
FIG. 5 is a cross sectional view of a tire comprising two carcass reinforcing plies.

To increase the tire load carrying capacity, the carcass may comprise a second reinforcement ply 54, see FIG. 5. The second reinforcement ply 54 is applied at the same time as the primary reinforcement ply 12 and follows the same general path as the primary reinforcement ply 12. However, the second reinforcement ply 54 does not complete turn about the hard rubber wedge 22. The material forming the cords in the second ply 54 is preferably the same material forming the cords in the principal ply 12, but may differ depending on the desired tire characteristics. If the cords of the first carcass reinforcement ply 12 are inclined at an angle of less than 90° relative to the equatorial plane, than the cords of the second ply 54 are preferably inclined at the same angle but in the opposite direction.

Figure 6:
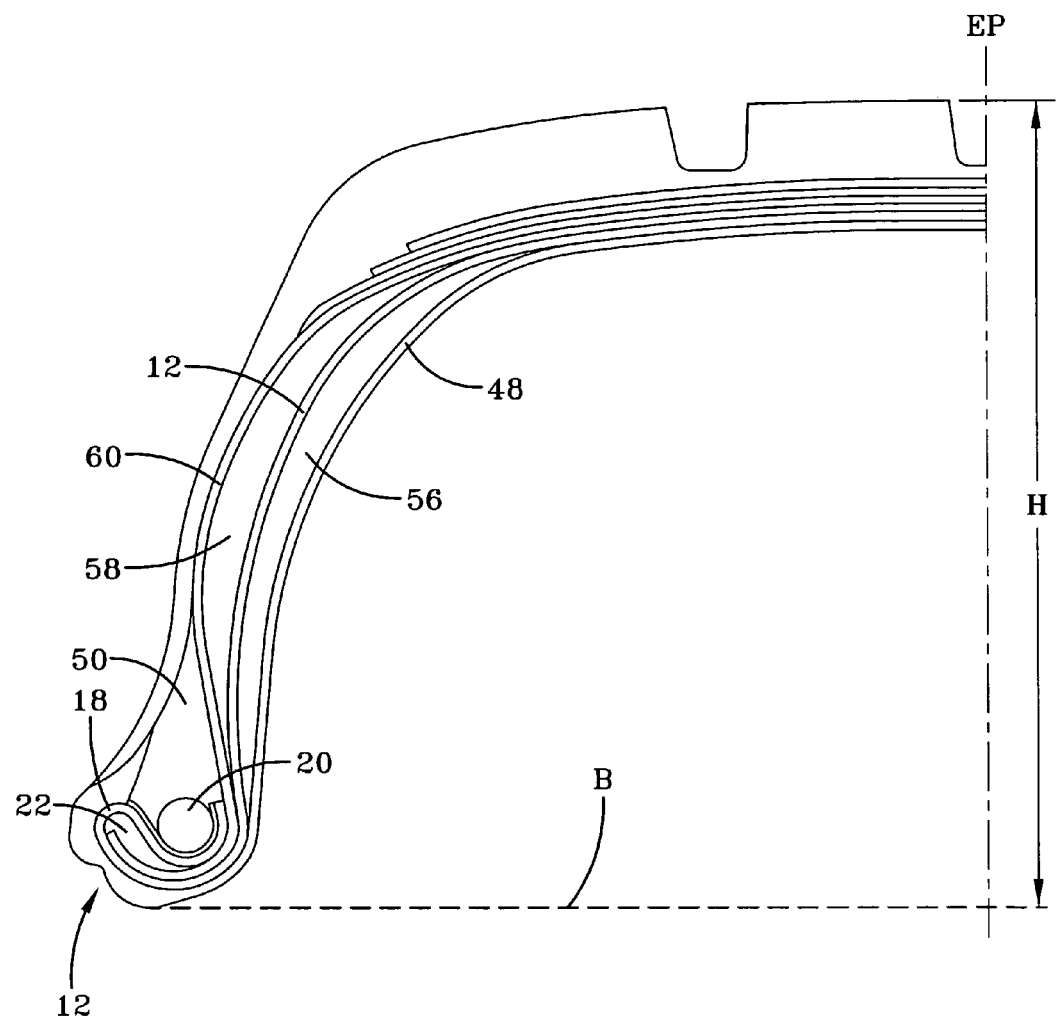
FIG. 6 is a tire incorporating multiple adjacent sidewall inserts.

To better tune the tire for preferred tire characteristics, the tire may be provided with multiple lenticular shaped inserts to create the desired pillar sidewall strength, see FIG. 6. The tire has a first elongated inserted 56 applied outward of the tire innerliner 48 and prior to application of a carcass reinforcement ply 12. After the primary carcass reinforcement ply 12 is wound onto the building drum but is not yet turned about the rubber wedge 22, a second elongated insert 58 is applied. A short length carcass reinforcement ply 60 is laid outward of the second elongated insert 58. The rubber wedge 22 is then laid on the ends of the reinforcement plies 12, 60, and the turnup portion 18 of the primary carcass reinforcement ply 12 is then wound about the rubber wedge 22 and the bead ring 20 is applied to lock in the end of the turnup portion 18. In this manner, the ends of the short carcass reinforcement ply 60 and the radially inner end of the axially outer elongated insert 58 are secured between the main portion 16 and the turnup portion 18 of the primary carcass reinforcement ply 12.

The physical properties of the two elongated inserts 56, 58 may be identical or may vary. Preferably, the radially inner first insert 56 has a Shore A hardness less than that of the radially outer second insert 58. Also, the relative widths of the two inserts 56, 58 may be identical or vary. Whatever relative widths are chosen for the two inserts 56, 58, the substantially constant width for the tire sidewalls 40 is be maintained.

Figure 7:
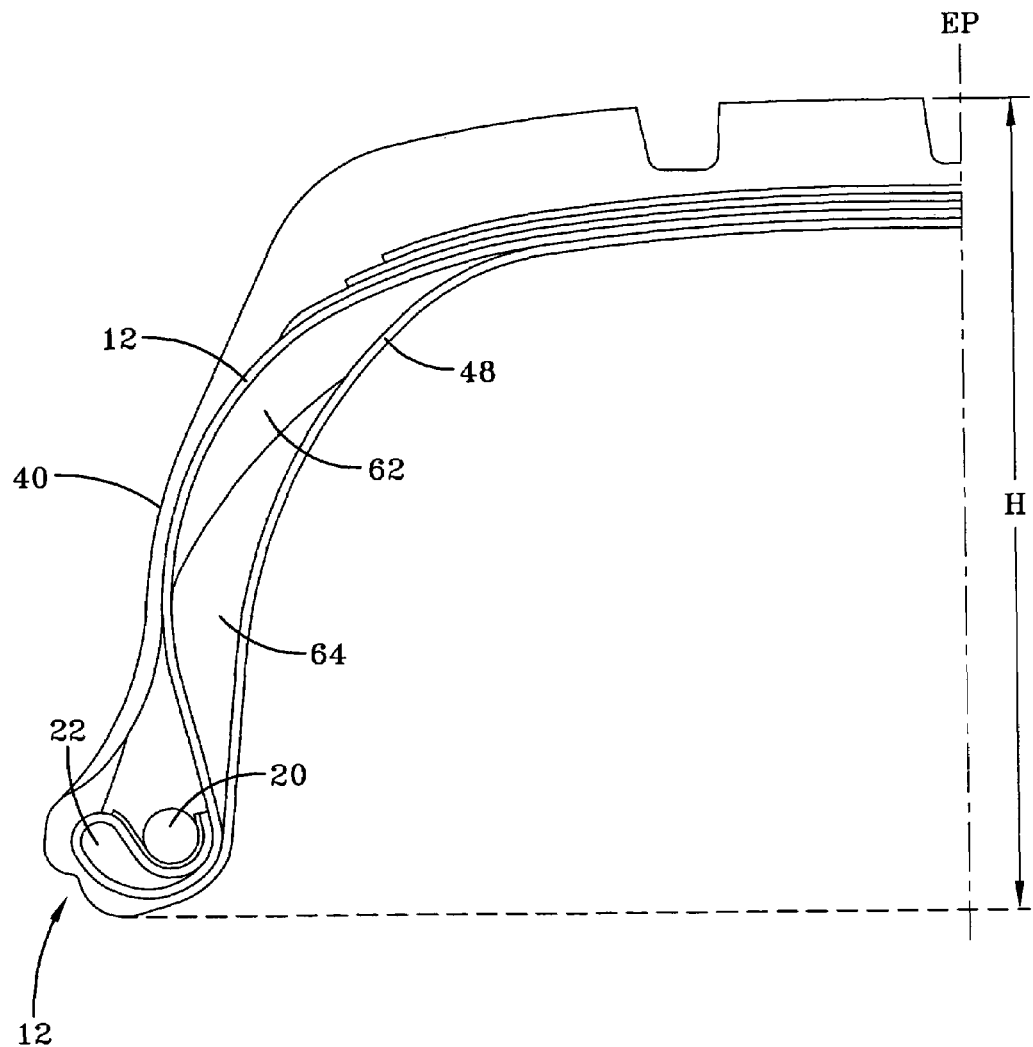
FIG. 7 is an alternative construction for a tire with multiple sidewall inserts.

In the tire of FIG. 7, a combination of two lenticular shaped inserts 62, 64 are again combined to form an overall lenticular shape support as part of the pillar structure of the tire sidewall 40, however, the two inserts 62, 64 are primarily radially adjacent, not axially adjacent as in the previous tire. The two inserts 62, 64 are placed axially inward of the carcass reinforcement ply 12, and the carcass reinforcement may be one or multiple plies. The radially outer insert 62 has a Shore A hardness less than that of the radially inner insert 64. The softer insert 62 in the shoulder region of the tire maximizes run-flat properties of the tire with a minimum degradation to ride comfort.

For each of the tires illustrated and discussed above, the opposing bead rings 20 and sidewalls 40 may have an identical diameter and height, respectively; that is, the non-illustrated portion of the tire is a mirror image of that illustrated. However, it is also within the scope of the present invention to form any of the discussed tires such that the diameters of the opposing beads 20 are different, as seen in FIG. 8.

Figure 8:
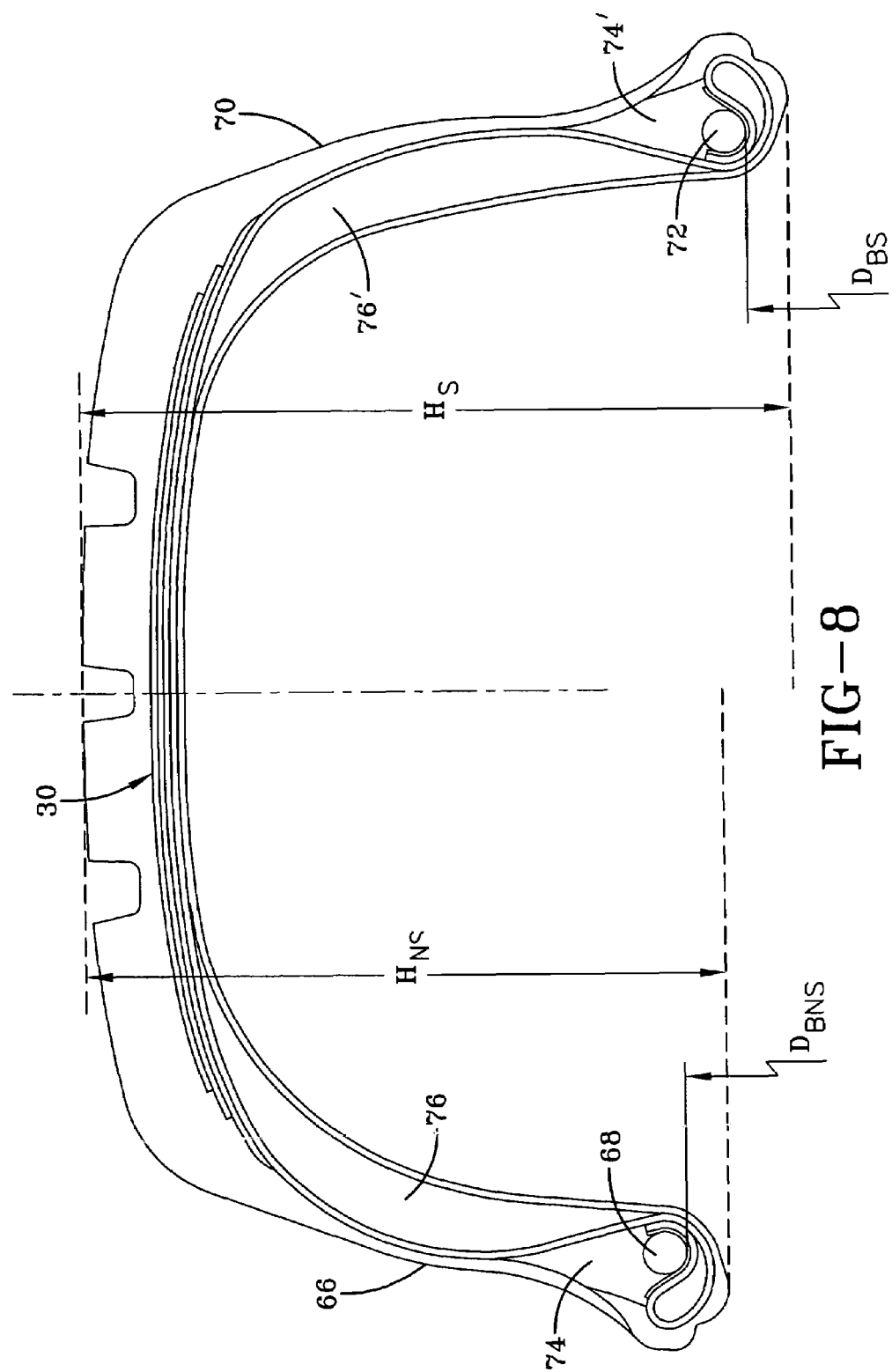
FIG. 8 illustrates a tire of the present invention with different bead and sidewall diameters.

The tire of FIG. 8 has a short sidewall 66 with a bead ring 68 of relatively greater diameter $D_{BS}$, and a long sidewall 70 with a bead ring 72 of relatively smaller diameter $D_{BNS}$. When mounted on a vehicle, the shorter sidewall 66 is mounted facing inward and is referred to as the non-stamped sidewall and the opposing sidewall 70 is referred to as the stamped sidewall as this is the sidewall 70 provided with conventional tire sidewall identification. The tire is mounted on a tire rim having corresponding offset rim diameters to accommodate the different bead diameters.

Each sidewall 66, 70, regardless of length, has a substantially constant width from the bead portion 12 to the axial edges of the belt structure 30. The relative heights of the sidewall inserts 74, 74', 76, 76' when based on the tire height, are measured based on the height of the sidewall 66, 70 in which the inserts 74, 74', 76, 76' are located. Thus, triangular insert 74 has a height based on sidewall height $H_S$ and triangular insert 74' has a height based on sidewall height $H_{NS}$. The relative heights of the inserts 74, 74' are the substantially similar. The same applies for the lenticular inserts 76, 76'. Any of the various embodiments of inserts and reinforcement plies discussed previously may be employed in the asymmetrical tire of the FIG. 8.

The relative Shore A hardness properties of the inserts 74, 74', 76, 76' in the opposing sidewalls 66, 70, for manufacturing simplicity, are identical, and the only difference between the inserts 74, 74', 76, 76' is the radial length. However, for either larger sized tires or for tires with a large variation in the sidewall heights $H_S$, $H_{SN}$, the properties of the sidewalls may need to be different in order to balance the properties of the tire and the spring rate of the two sidewalls 66, 70. One method of balancing is that the inserts 74', 76' in the longer sidewall 70 having the smaller bead diameter $D_{BS}$ may have a Shore A hardness less than the Shore A hardness of the corresponding inserts 74, 76 in the shorter sidewall 66 having the larger bead diameter $D_{BNS}$. In another variation, the cross-sectional width W of the shorter sidewall 66 having the larger bead diameter $D_{BNS}$ is greater than the cross-sectional width W of the longer sidewall 70 having the smaller bead diameter $D_{BS}$.

The present invention represents a step forward in run-flat tire technology. In previously known self-supporting tires, due to the use of a conventional tire rim and the manufacturing tolerances of known rims, self-supporting tires have had to be manufactured to very tight tolerances and extremely tight bead areas to prevent bead unseating of the tire. The use of a carcass profile that results in the bead region locking into the wheel rim during expansion of the tire enables the tire designer to create a self-supporting tire tuned for better run-flat capabilities, including increased load capacity.

What is claimed is:

1. A pneumatic run-flat tire, the tire comprising a radial carcass reinforcement ply, a belt structure, a pair of opposing bead regions, each bead region has a bead toe and a bead heel wherein the bead toe is axially outward and radially inward of the bead heel, and a sidewall radially outward of each bead region, each bead region having a bead wire wherein a cross-sectional width of the sidewall from radially outward of the bead region to the ends of the belt structure being substantially constant, so that the cross-sectional width of the sidewall varies by no more than 30% of the smallest cross-sectional width, the substantially constant cross-sectional width begins at a radial height of 15 to 25% of the radial height of the tire as measured from the bead base line and no more than 5% of the radial height of the tire from the radially outer surface of the bead wire;

a first rubber insert located axially inward of the carcass reinforcement ply, the first rubber inset being generally lenticular in cross-sectional configuration and a second rubber insert located radially outward of the bead wire and axially outward of a main portion of the carcass reinforcement ply, wherein the main portion of the carcass ply extends between the bead wires;

a total cross-sectional gauge of the rubber inserts is substantially constant from the radially outer surface of the bead wire to an axially outer end of the belt structure; and the first rubber insert has a radially innermost end that radially overlaps the second rubber insert, the overlap distance being in the range of 90 to 65% of the radial length of the second rubber insert.

2. The pneumatic run-flat tire of claim 1 wherein the tire sidewall in the lower 50% of the tire height has a cross-sectional width that varies by no more than 20% of the smallest width of the sidewall cross-sectional width.

3. The pneumatic run-flat tire of claim 1 wherein any variation in the cross-sectional width of the tire sidewall is greater in the radially outer portion of the sidewall than in the radially inner sidewall portion.

4. The pneumatic run-flat tire of claim 1 wherein the first rubber and the second rubber inserts are formed from the same material.

5. The pneumatic run-flat tire of claim 1, the bead region comprising a rubber wedge located axially outward of the bead wire, wherein the rubber wedge has a Shore A hardness greater than the Shore A hardness of either the first rubber insert or the second rubber insert.

6. The pneumatic run-flat tire of claim 1 wherein the first insert has a Shore A hardness at 100° C. in the range of about 55 to about 90.

7. The pneumatic run-flat tire of claim 1 wherein the radially outer end of the second rubber insert in each sidewall is at a radial height of 25% to 80% of the tire height.

8. The pneumatic tire of claim 1 wherein the tire is further comprised of at least one short length reinforcing ply of parallel cords extending from the bead portion to the upper sidewall of the tire.

9. The pneumatic tire of claim 8 wherein the at least one short length reinforcing ply is at least partially adjacent to the carcass reinforcing ply.

10. The pneumatic tire of claim 8 wherein the at least one short length reinforcing ply does not contact the carcass reinforcing ply in the bead portion of the tire.

11. The pneumatic tire of claim 1 wherein the first insert is comprised of at least two different rubber inserts wherein one insert has a Shore A hardness greater than the other insert.

12. The pneumatic tire of claim 11 wherein one of the two different rubber inserts forming the first insert is radially outward of the other different rubber insert and has a Shore A hardness less than the radially inward different rubber insert.

13. The pneumatic tire of claim 1 wherein the carcass reinforcement ply is comprised of a pair of reinforcing cords plies, the second ply terminating radially inward of the bead ring.

14. The pneumatic tire of claim 1 wherein the carcass reinforcement ply is comprised of a pair of reinforcing cord plies, and the tire further comprising a third insert located in the tire sidewall, the third insert being sandwiched between the two carcass reinforcing cord plies.

15. The pneumatic tire of claim 1 wherein the bead rings in each bead region have differing bead diameters.

16. The pneumatic tire of claim 15 wherein the cross sectional width of the sidewall radially outward of the larger diameter bead ring is greater than the cross sectional width of the sidewall radially outward of the smaller diameter bead ring.

17. The pneumatic tire of claim 15 wherein the first rubber insert in the sidewall radially outward of the larger diameter bead ring has a Shore A hardness less than the first rubber insert in the sidewall radially outward of the smaller diameter bead ring.

* * * * *